J. M. BURTON.
SEPARATOR FOR METERS.
APPLICATION FILED DEC. 6, 1911.
1,130,792.
Patented Mar. 9, 1915.
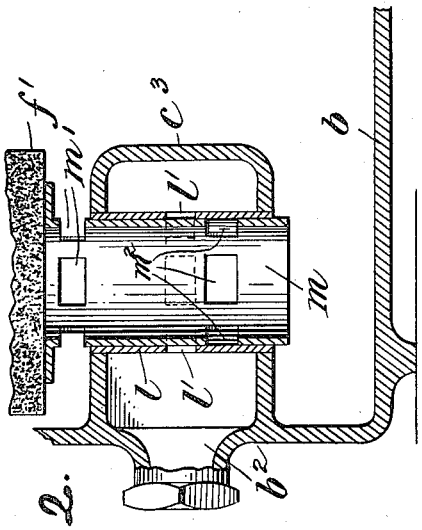
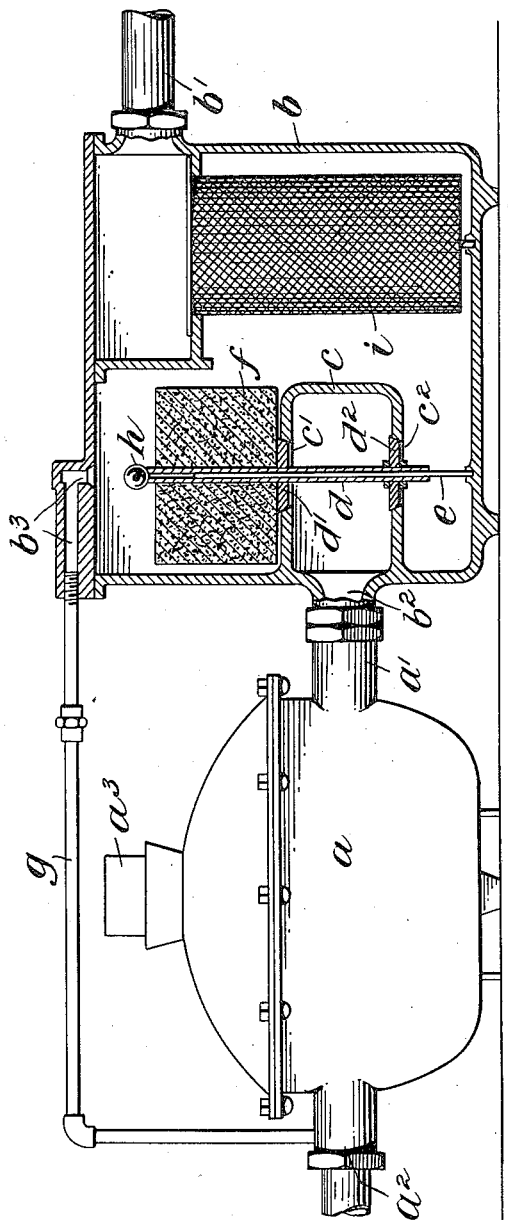
Attest:
W. J. McGinn
Charles Schroder
Inventor:
James M. Burton
by Redding, Greeley & Austin
Att'ys.

UNITED STATES PATENT OFFICE.

JAMES M. BURTON, OF LONG ISLAND CITY, NEW YORK, ASSIGNOR TO NEPTUNE METER COMPANY, OF NEW YORK, N. Y., A CORPORATION OF NEW JERSEY.

SEPARATOR FOR METERS.

1,130,792.  Specification of Letters Patent.  Patented Mar. 9, 1915.

Application filed December 6, 1911. Serial No. 664,131.

*To all whom it may concern:*

Be it known that I, JAMES M. BURTON, a citizen of the United States, residing in Long Island City, Queens county, State of New York, have invented certain new and useful Improvements in Separators for Meters, of which the following is a specification, reference being had to the accompanying drawing, which forms a part hereof.

The operation of fluid meters of the displacement type, intended to measure the flow of relatively dense fluids, such as water, gasolene, etc., is rendered uncertain and unreliable by entrained air, gas or vapor which is permitted to pass through the meter either in advance of the denser fluid or with it or following it, since such air, gas or vapor itself occupies more or less of the volume of the displacement space and therefore causes an unknown error in the registration of the meter as to the actual volume of the denser fluid which passes through it. This unreliability is particularly marked in the measuring, with such meters, of liquids like gasolene which easily set free a considerable volume of vapor. It is the object of this invention to overcome this difficulty and this object is accomplished by combining with the meter a separator in which the vapor or other lighter fluid is separated from the liquid or denser fluid and from which it is permitted to escape without passing through the meter, while the liquid or denser fluid is permitted to pass therefrom to the meter which then registers accurately the volume of liquid which passes through it.

The invention will be more fully explained hereinafter with reference to the accompanying drawing in which it is illustrated and in which—

Figure 1 is a view partly in elevation and partly in vertical section showing a separator of approved form in connection with a meter. Fig. 2 is a detail section view of a modified form of the devices for controlling the flow of the liquid or denser fluid from the separator to the meter.

The meter with which the separator is employed may be of any approved form and in the drawing there is shown at $a$, in elevation, a displacement meter of ordinary form, having an inlet at $a'$, an outlet at $a^2$ and a register at $a^3$. The separator hereinafter described is connected to the inlet $a'$ of the meter in any convenient manner and may be located close to the meter as shown or at any convenient point. It comprises a closed vessel $b$, having an inlet as at $b'$ for the liquid to be measured, an outlet for the liquid or denser fluid, as at $b^2$, connected to the inlet $a'$ of the meter, and an independent outlet $b^3$ communicating with the upper portion of the vessel for the lighter fluid, such as air, gas, or vapor which is separated from the liquid or denser fluid in the vessel $b$. By locating the inlet $b'$ at the upper portion of the vessel the liquid falls freely as it enters and permits more effective separation. The outlet $b^2$ for the liquid is controlled by a valve as hereinafter described and is normally closed, the valve being opened by the buoyancy of the float in the vessel $b$. The outlet $b^3$, for the lighter fluid, is normally open, so as to permit the escape of the lighter fluid from the vessel $b$, but is closed by a valve actuated by the accumulating liquid in the vessel $b$. The valves may be variously formed to meet the different requirements of use.

The valve which controls the flow of the liquid from the separator to the meter is preferably a balanced valve operated by a float. As shown in Fig. 1 a valve casing $c$, within the vessel $b$, surrounds the outlet $b^2$ and has ports $c'$ and $c^2$ in its upper and lower walls. The casing $c$ and outlet $b^2$ are in substantial alinement with the meter inlet $a'$ and the meter $a$, as shown, thereby affording free and unrestricted flow of the liquid to the meter and further composing a compact and relatively cheap apparatus for the purpose intended. A tube $d$, mounted upon a guide rod $e$ fixed at its lower end to the bottom of the vessel $b$, carries valve disks $d'$ and $d^2$ to coöperate respectively with the ports $c'$ and $c^2$. A float $f$ is secured to the tube $d$ above the valve casing $c$ so that the liquid, as it accumulates in the vessel $b$, acting upon the float $f$, lifts the valve disks $d'$ and $d^2$ from their seats and permits the flow of the liquid from the vessel $b$ to the meter $a$. Obviously, until the liquid accumulates in the vessel $b$ sufficiently to cover the valve casing $c$ and to raise the float, the outlet $b^2$ of the separator is closed and no air, gas or vapor can pass through the meter. The outlet $b^3$, however, is open meanwhile and the air, gas or vapor is therefore permitted to escape from the upper part of the separator.

In the embodiment of the invention shown in Fig. 1 provision is made for conducting the vapor which escapes from the separator into the ultimate receptacle for the liquid by a by-pass $g$ which is shown as connected to the outlet $a^2$ of the meter, this arrangement satisfying the rules or ordinances relating to the handling of gasolene which forbid the discharge of gasolene vapor in a public street, for example. The disposition of the by-pass $g$, as described, is such that the gas will be carried through a relative short channel before reuniting with the liquid and the attachment of the ends of the by-pass at the outlet $b^3$ and to the outlet $a^2$ of the meter and in such close relationship to the latter is important in realizing one of the principal objects of the invention, which is, the provision of a compact and cheap apparatus for insuring accurate registration of the meter without losing the gas. The outlet $b^3$ is normally open, but to prevent the escape of any liquid it may be controlled by a valve which, as stated, is actuated by the liquid in the vessel $b$. As shown in Fig. 1 a valve $h$ is carried on the upper end of the tube $d$ so that when the float rises with an accumulation of liquid in the vessel $b$ the valve $h$ closes the outlet $b^3$. The vessel $b$ may be provided with a screen $i$ through which the liquid is discharged into the reservoir.

Another form of valve for controlling the liquid outlet $b^2$ is shown in Fig. 2. In this construction the valve casing $c^3$ has secured therein a tube $l$, open at its upper and lower ends and having ports $l'$ which communicate with the interior of the valve casing. The float $f'$ carries a sleeve valve $m$, open at its lower end and having at its upper end ports $m'$ and provided also with ports $m^2$ which are normally closed by the tube $l$ but are brought into registration with the ports $l'$ to permit the flow of the liquid through the outlet to the meter when the float and valve are raised by the accumulating liquid in the vessel $b$.

The operation of the separator has been sufficiently described and will be understood without further explanation. It will also be understood that various changes in details of construction and arrangement can be made to suit different conditions of use and that the invention is not restricted to any particular construction shown and described herein.

I claim as my invention:—

The combination with a meter of a closed vessel having an inlet for volatile liquids adjacent the top thereof, a valve casing within the vessel having an outlet for liquid disposed below the level of said inlet, said outlet communicating with the inlet for the meter through a relatively short passage and being formed in substantial alinement with the inlet to the meter, the meter being disposed in juxtaposition to the vessel, ports in the valve casing to permit the flow of liquid from the first named vessel to the outlet, valves to control the ports, a float operatively connected to said valves to control the same, an independent outlet for gas adjacent the top of said first named vessel, a valve carried on the float and arranged to coöperate directly with the said outlet for gas to control the flow of gas from the vessel, and a by-pass communicating directly with the outlet for gas and with the outlet of the meter at a point in juxtaposition to the meter.

This specification signed and witnessed this 5th day of December A. D., 1911.

JAMES M. BURTON.

Signed in the presence of—
A. B. RICKETTS,
H. R. WILFORD.